July 15, 1969 P. E. GIES ET AL 3,455,563
OSCILLATORY SHAFT EXTERNAL SEAL STRUCTURE
Filed March 18, 1966 2 Sheets-Sheet 1
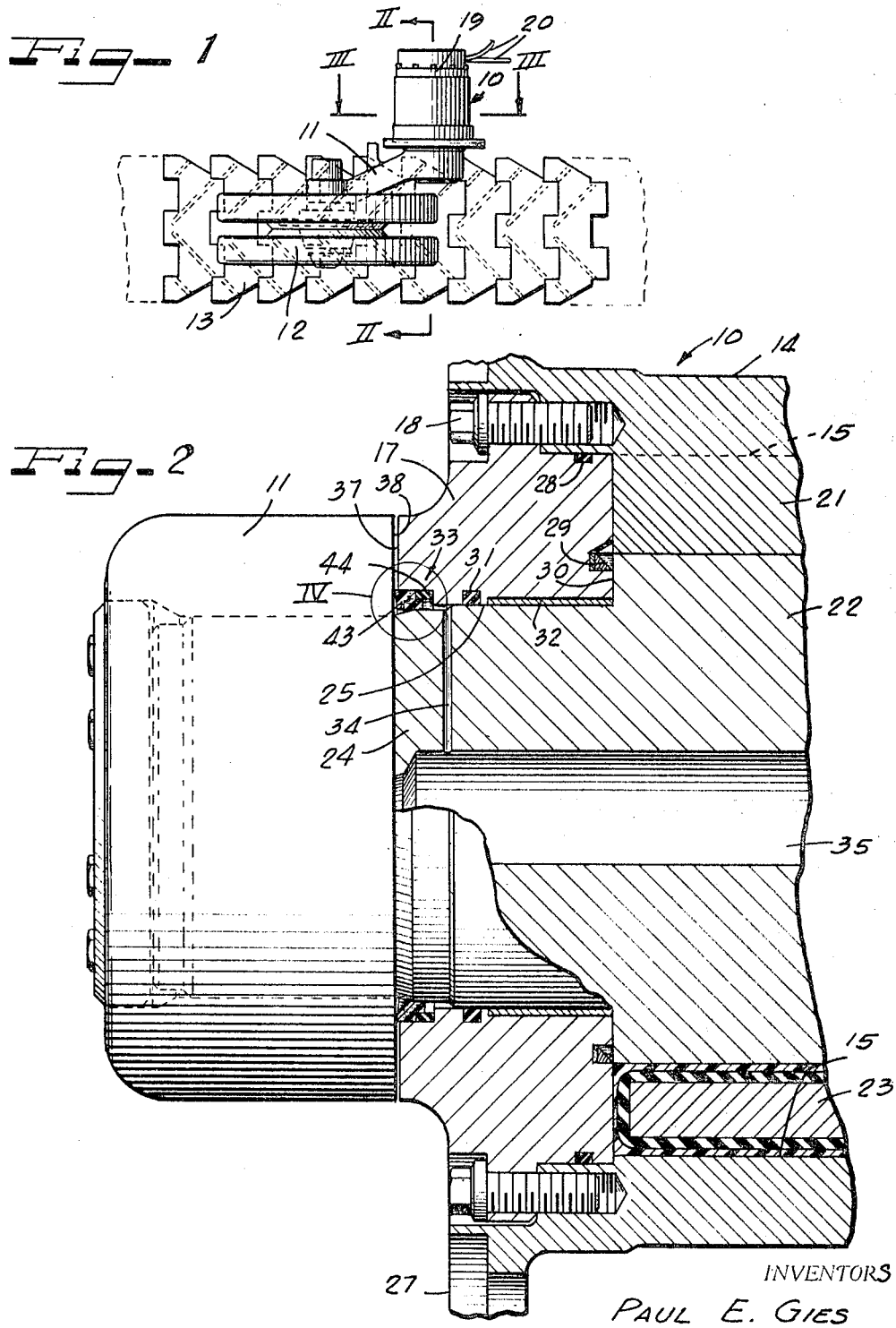
INVENTORS
PAUL E. GIES
GOTTLIEB SPERL
BY Hill, Sherman, Meroni, Gross & Simpson ATTORNEYS July 15, 1969  P. E. GIES ET AL  3,455,563
OSCILLATORY SHAFT EXTERNAL SEAL STRUCTURE
Filed March 18, 1966  2 Sheets-Sheet 2
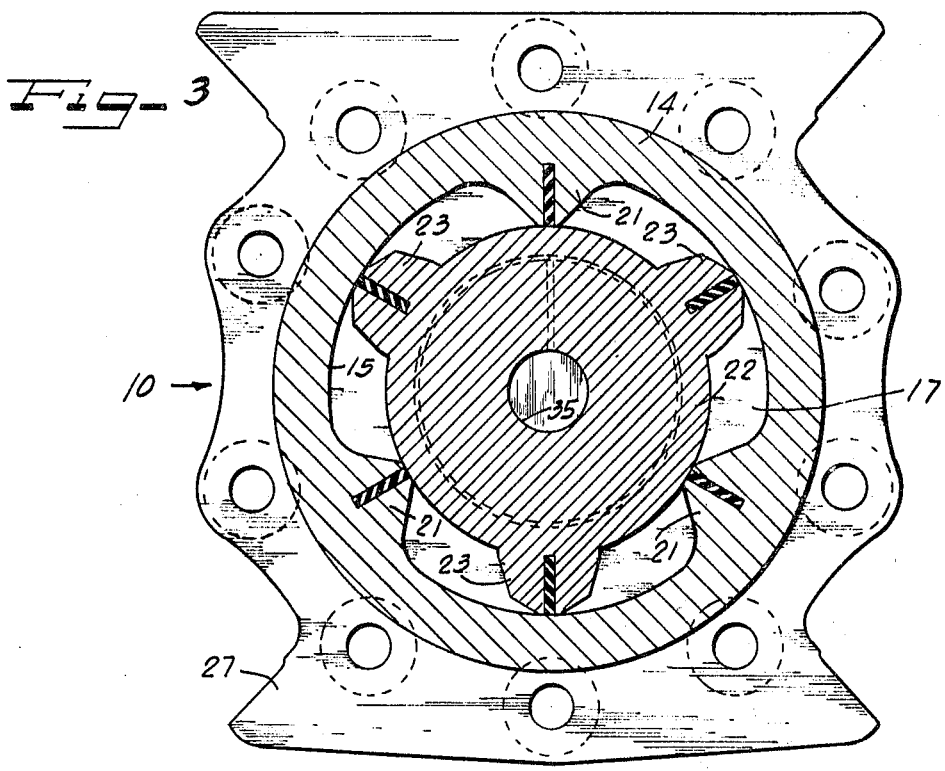
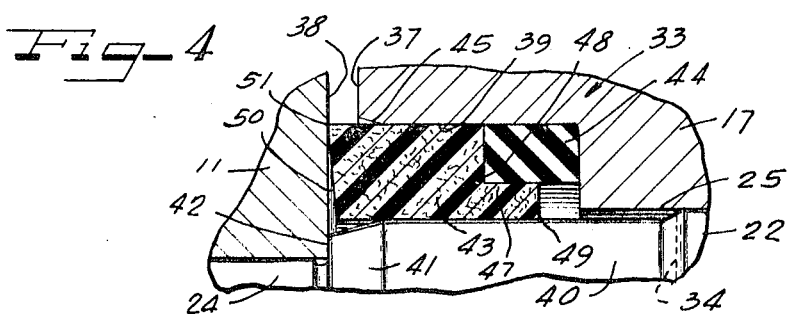
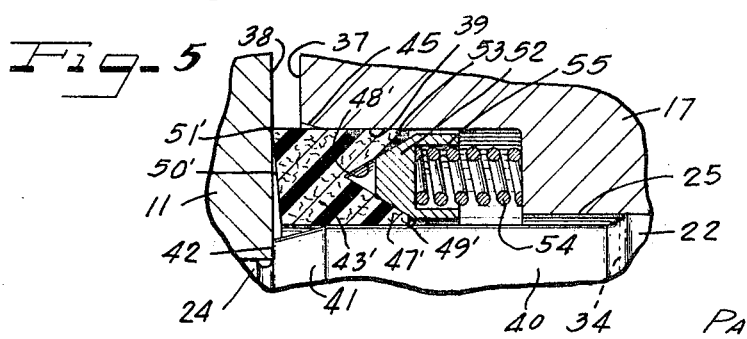
INVENTORS
PAUL E. GIES
GOTTLIEB SPERL
BY ATTORNEYS

United States Patent Office 3,455,563
Patented July 15, 1969

3,455,563
OSCILLATORY SHAFT EXTERNAL
SEAL STRUCTURE
Paul E. Gies, Eggertsville, and Gottlieb Sperl, Buffalo,
N.Y., assignors to Houdaille Industries, Inc., Buffalo,
N.Y., a corporation of Michigan
Filed Mar. 18, 1966, Ser. No. 535,501
Int. Cl. F16j 15/34, 15/54
U.S. Cl. 277—84                                      1 Claim

ABSTRACT OF THE DISCLOSURE

A seal ring has an inner perimeter for engaging about a shaft and an outer periphery, with a frusto conical end face slanting from the inner perimeter to convergence with the periphery and forming therewith an annular sealing edge lip to engage a confronting surface such as on a part corotative with the shaft, biasing means thrusting the seal ring against the shaft and toward said surface.

---

This invention relates to novel external seals especially useful with oscillatory shafts, and more particularly under conditions where sealing must be effected under conditions of extreme liability to contamination.

As an example of such conditions, great difficulty has been experienced in avoiding contamination through the joint between the road arms and the housings of rotary actuators used in the suspensions systems for endless track or crawler tread running gear of land and amphibious vehicles. In this type of equipment seals that may perform satisfactorily where there is continuous or unidirectional rotation, fail where there is only oscillatory motion between the parts to be sealed. Finely particulate contaminants such as sand tend to enter lapping, relatively oscillatory surfaces related to the seal. This difficulty is aggravated where the equipment must operate in a widely varying range of temperatures, and more particularly where the pressures to which the seal is subjected vary widely.

Experience with prior seals has resulted in failures due to deterioration, abrasion, sometimes blowing out of rubber elements in the higher ranges of internal pressures, and the like. When check valves have been installed to protect against excessive internal pressures, metallic sealing surfaces have been starved of necessary lubrication.

It is, accordingly, an important object of the present invention to overcome all of the foregoing and other difficulties and disadvantages of prior seals and to provide a new seal structure which is especially suitable for, and long lived under, conditions of oscillatory motion, wide operating temperature differentials, and which is capable of withstanding a wide range of external and internal pressure variations including intensive internal pressure surges.

Another object of the invention is to provide a novel seal structure which is especially suitable for use as an external seal between the housing and the wing shaft of a road wheel rotary actuator in an endless track vehicle running gear, and more particularly at the joint between the housing and the wing shaft where a road arm surface adjacently opposes the actuator housing.

A further object of the invention is to provide a novel seal structure of the character indicated which is simple, comprises a minimum number of parts, is highly efficient and durable and of low cost.

Other objects, features and advantages of the invention will be readily apparent from the following detailed description of certain preferred embodiments thereof, taken in conjunction with the accompanying drawings, in which:

FIGURE 1 is a fragmentary top plan view of an endless track vehicle running gear employing a rotary actuator embodying features of the invention;

FIGURE 2 is an enlarged fragmentary axial sectional detail view through the actuator taken substantially in the plane of line II—II of FIGURE 1;

FIGURE 3 is an enlarged cross sectional detail view taken substantially on line III—III of FIGURE 1;

FIGURE 4 is a substantially enlarged fragmentary sectional detail view showing the seal structure in the area IV of FIGURE 2; and FIGURE 5 is a similar sectional detail view of a modification of the seal structure.

As an example of apparatus in which the present invention is especially useful, FIGURE 1 depicts a rotary actuator 10 comprising part of a hydropneumatic suspension system for endless crawler track running gear of a land or amphibious vehicle to the body frame or hull of which the actuator is fixedly attached. Operatively connected to the actuator is a road arm 11 rotatably mounting a road wheel 12 in running, levelling control of an endless track 13.

As seen in FIGURES 2 and 3, the rotary actuator 10 comprises a housing including a tubular body 14 defining therein a working chamber 15 closed at its front end by an end closure disk member 17 attached to the body 14 by means of bolts 18. At its opposite end the working chamber 15 is closed by an end closure and manifold structure 19 arranged to be connected by suitable conduits 20 operatively into a hydraulic control system of the associated vehicle.

Within the working chamber 15, the housing 14 has a plurality of equally spaced radially inwardly projecting abutments 21 which at their tips slidably engage the cylindrical perimeter of a wing shaft 22 provided with radially outwardly projecting vanes 23 equal in number and spacing to the abutments and slidably engaging the generally cylindrical wall defining the working chamber 15 between the abutments, whereby the wing shaft is adapted for oscillatable movement within the actuator housing responsive to differential hydraulic pressure on respectively opposite sides of the vanes or by the mechanical stimulus of the road arm 11 which is fixedly attached to a forward end portion 24 of the wing shaft projecting through and beyond the end closure member 17 which provides a journal bore 25 therefor. About its forward end portion, the housing body 14 has a lateral attachment flange 27 by which it is adapted to be bolted onto the associated vehicle frame or hull.

To seal the working chamber 15 against leakage of hydraulic fluid past the end closure 17, a static ring seal 28 is provided between the body 14 and the end member. A dynamic seal 29 is provided between the end member and an axially outwardly facing shoulder 30 on the body of the wing shaft annularly about the forward end projecting portion 24. Between the shoulder 30 and a dynamic internal seal 31 between the wall defining the bore 25 and the perimeter of the projecting portion 24 of the wing shaft is a bearing 32 which is lubricated by the oil comprising the hydraulic fluid, as is usual. Outwardly spaced from the seal 31 is an external seal 33 between the end closure member 17 and the shaft portion 24, and a bleed-off port 34 leads from the perimeter of the shaft portion between the seals 31 and 33 to an axial bore 35 in the wing shaft suitably connected to a drain duct in the hydraulic circuit to which the actuator is connected.

During operation of the running gear, the road arm 11 is caused by the road wheel 12 to oscillate with considerable frequency which increases with the running speed of the vehicle. Further, high amplitude oscillations at high speed, specially, tend to generate a wide range of pressure conditions from partial vacuum to heavy pressure surges, having effect on the sealing system and more particularly the dynamic seals and being especially significant in respect to the external seal 33. For example, in an installation requiring operating efficiency of the seals in a temperature range of from about −65° F. to 250° F. pressures may range from 30 p.s.i. external and partial vacuum to 50 p.s.i. normal, with possible pressure surges to 3,000 p.s.i. or higher internally. Under such conditions the external seal 33 must not only prevent hydraulic fluid leakage, but must also provide assurance against ingress of any contaminating material. Due to the relative oscillating motion of the wing shaft, and the road arm 11, considered as a unit; and the housing 14 of which the end closure 17 may also be considered part thereof, it will be appreciated that the external seal 33 is especially vulnerable.

According to the present invention, the seal 33 thoroughly seals the opposing surfaces engaged thereby on the housing and wing shaft against fluid leakage, and provides a dynamic barrier against entry of contaminants through the necessary clearance joint between an axially outwardly directed face 37 on the housing end member 17 and a laterally extending and axially inwardly facing surface 38 about the wing shaft on the shaft-attached hub end portion of the road arm 11. To this end, the housing member 17 is formed in the outer end of the bore 25 with a seal chamber counterbore 39 of suitable diameter and depth opening through the face 37 (FIGS. 2 and 4) and about a slightly reduced diameter perimeter 40 on the wing shaft portion 24 extending outwardly beyond the port 34 to a lead-in annular chamfer 41 bevelled to a stepped annular shoulder 42 against which the inner margin of the surface 38 is engaged.

Within the seal chamber thus provided is accommodated an annular two-part seal assembly including a seal ring 43 and biasing means comprising, in one desirable form, an elastomeric ring 44.

In a desirable construction, the seal ring 43 is made as a molded part of a reinforced self-lubricating plastic material such as polytetrafluoroethylene having uniformly distributed therein reinforcing fiberglass fibers. By bulk the reinforcing fibers may comprise about one-fourth or less of the sealing ring. In addition, there is desirably incorporated in the ring a particulate solid state lubricating material such as powdered molybdenum disulfide to improve the self-lubricating properties of the ring. In a practical example, the plastic has constituted 75% by volume, the reinforcing fibers 23% and the particulate lubricating material 2%.

For sealing engagement with the shaft surface 40, the inside diameter of the sealing ring 43 is formed originally slightly smaller than the diameter of the surface 40, and the chamfer enables ready endwise stretching of the ring in forcing it longitudinally onto the surface 40. On its outside diameter, the ring 43 is desirably originally complementary to the counterbore diameter or of only slightly undersized dimension so that as the ring is stretched onto the surface 40 it will expand into sufficiently close sealing engagement with the counterbore surface but without undue resistance, a lead-in chamfer 45 at the outer end of the counterbore facilitating assembly.

Operative cooperation of the biasing ring 44 with the seal ring 43 is accomplished by having the biasing ring 44 of complementary inside diameter to an annular inward tail extension 47 on the seal ring along its annular inner sealing perimeter or bore and defining with the body of the seal ring a rabbet groove seat 48 affording respective axially inwardly and radially outwardly facing seat surfaces against which the biasing ring thrusts to urge the sealing ring axially outwardly toward the surface 38 and the tail extension 47 crampingly into sealing engagement with the surface 40. For this purpose, the biasing ring 44 is of suitably larger initial outside diameter than the seal chamber counterbore diameter and of sufficient length relative to the body of the seal ring 43 to compel substantial compression of the biasing ring between the seal ring body and the base of the counterbore and between the axial wall of the counterbore and the tail annulus 47 in the fully assembled relation of the seal 33 with the actuator and road arm component to afford the efficient biasing action attained with the biasing ring. In addition, of course, the biasing ring 44 serves as a sealing ring due to its substantial surface engagement with the housing member 17 and with the sealing ring 43.

By virtue of the uniformly radially inward compressive thrust of the biasing ring 44 against the tail extension 47, a sealing lip 49 engaging the shaft surface 40 at the inner extremity of the tail extension serves as an effective barrier against outward leakage of hydraulic fluid past the sealing ring. Should there be high pressure surges of hydraulic fluid into the seal chamber 39, action of the pressure serves to increase the sealing efficiency of the lip 49, because if the exposed rear end portion of the biasing ring 44 tends to yield under the fluid pressure thrust, effect of the fluid pressure will be extended in the interface between the biasing ring and the tail extension 47 and thus act to thrust the lip 49 with multiplied sealing effectiveness on surface 40.

Under the axially outward biased thrust of the sealing ring 43, its annular outer end face 50 presses sealingly against the surface 38. To enhance the sealing effectiveness of the end face 50 against the surface 38, it is provided with an annular sealing edge 51 projecting into engagement with the surface 38 and spaced radially outwardly from the inner sealing perimeter of the ring. To this end, the end surface 50 is formed frusto-conically, tapering outwardly from the inner perimeter to the outer perimeter of the ring 43, which perimeter extends normal to the surface 38, whereby the projection 51 provides a dihedral angle sealing lip against the intrusion or incursion of foreign matter to the wing shaft. The advantages of this arrangement will be clear when it is remembered that in normal operation the seal assembly 33 will tend to remain stationary with the housing member 17 while the wing shaft and its, in effect, extension joint surface 38 move oscillatably relative to the seal assembly. The sealing lip 51 serves as an effective barrier against fluid intrusion from the open joint between the surfaces 37 and 38 as well as against particulate material either carried in fluid or dry. Should any fine bit of solid foreign material work past the lip 51, such bit of foreign material will, due to the interface pressures, embed in the material of the seal member 43 without damage where the seal member body comprises polytetrafluoroethylene.

If, due to the conditions internally or externally of the actuator, it may be feared that deterioration of an elastomeric biasing ring may undesirably occur, a biasing ring 52 (FIG. 5) of more resistant material, such as metal, may be substituted. For this purpose, the biasing ring 52 is of generally truncated wedge-shaped cross section and the annular groove 48' in the seal ring 43' is of complementary generally V-shaped cross section such that axially outward thrust of the ring 52 biases the annular tail extension 47' compressively against the shaft surface 40 for effective sealing of the sealing lip 49'. At the same time the corresponding second seal tail extension 53 aligned with the outer perimeter of the seal ring is thrust expansively radially outwardly against the axial wall of the seal chamber counterbore 39. Biasing thrust of the ring 52 is imparted by metal spring means such as a plurality of compression springs 54 extending into rearwardly opening sockets 55 in the compression ring and bottomed against the axially outwardly facing base surface of the seal chamber counterbore. Alternatively, of course, a single spring of a diameter complementary to the compression ring 52 may be substituted for the individual springs. Through this arrangement, not only does the compression ring 52 thrust the tail extensions 47' and 53 sealingly in the respective opposite radial directions due to wedging action of the biasing ring, but it effectively thrusts the seal ring 43' axially outwardly to effect sealing engagement of the annular face 50', and more particularly the projecting sealing edge or lip 51' against the confronting surface 38.

It will be understood that modifications and variations may be effected without departing from the scope of the novel concepts of the present invention.

We claim as our invention:

1. In a rotary actuator or like assembly including a housing structure having a shaft oscillatably journalled therein with an end portion projecting outwardly from an axially outwardly directed face of the housing structure and having thereon means oscillating with the shaft and including a laterally extending and axially inwardly facing surface about said shaft closely opposing said face, said housing structure being provided with a counterbore defining an annular seal chamber about said shaft and opening through said face toward said surface:

- a seal ring in said chamber having an annular inner sealing perimeter engaging said shaft, and a radially outer periphery complementary to the counterbore and extending normal to said surface, said seal ring having an axially inner annular rabbet groove opening inwardly and toward the seal periphery and defined by an axially inwardly projecting tail extension aligned with said sealing perimeter;
- an annular frusto-conical end face on said ring confronting said surface and slanting from said perimeter to convergence with said periphery and forming therewith an annular sealing edge lip;
- and dual biasing means within said chamber acting on said ring to thrust at least a portion of said sealing perimeter radially inwardly against said shaft and to thrust said lip axially outwardly against said surface, said biasing means comprising an elastomeric ring engaged in said rabbet groove and sealingly thrusting against the walls defining said counterbore and seal ring and compressing said tail extension against the shaft.

References Cited

UNITED STATES PATENTS

| | | |
|---|---|---|
| 2,644,804 | 7/1953 | Rubin. |
| 2,760,794 | 8/1956 | Hartranft _____ 277—92 X |
| 2,819,917 | 1/1958 | Watson et al. _____ 277—117 |
| 2,827,314 | 3/1958 | Granberg et al. _____ 277—117 |
| 2,916,314 | 12/1959 | Secord et al. _____ 277—92 |
| 2,995,391 | 8/1961 | Snyder _____ 277—92 X |
| 3,033,578 | 5/1962 | Kellogg _____ 277—165 X |
| 3,195,421 | 7/1965 | Rumsey et al. _____ 277—92 X |
| 3,232,641 | 2/1966 | Perry _____ 277—95 |
| 3,269,738 | 8/1966 | Baumler et al. _____ 277—81 |
| 3,326,560 | 6/1967 | Trbovich _____ 277—205 X |

LAVERNE D. GEIGER, Primary Examiner

JEFFREY S. MEDNICK, Assistant Examiner

U.S. Cl. X.R.

277—81, 92, 143, 165, 205